United States Patent
Enomoto et al.

(10) Patent No.: US 6,580,854 B1
(45) Date of Patent: Jun. 17, 2003

(54) OPTICAL WAVEGUIDE GRATING AND METHOD OF MAKING THE SAME

(75) Inventors: Tadashi Enomoto, Kanagawa (JP); Shinji Ishikawa, Kanagawa (JP); Masakazu Shigehara, Kanagawa (JP); Michiko Harumoto, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 55 days.

(21) Appl. No.: 09/615,955

(22) Filed: Jul. 13, 2000

Related U.S. Application Data

(63) Continuation-in-part of application No. PCT/JP99/00040, filed on Jan. 8, 1999.

(30) Foreign Application Priority Data

Jan. 19, 1998 (JP) .......................................... 10-007534

(51) Int. Cl.$^7$ ................................................ G02B 6/34
(52) U.S. Cl. ........................................ 385/37; 385/141
(58) Field of Search .................... 385/37, 123, 141, 385/142; 65/384, 385

(56) References Cited

U.S. PATENT DOCUMENTS

| | | | |
|---|---|---|---|
| 5,478,371 A | * 12/1995 | Lemaire et al. ............... | 65/384 |
| 5,703,978 A | 12/1997 | DiGiovanni et al. .......... | 385/37 |
| 5,838,700 A | * 11/1998 | Dianov et al. ............... | 359/334 |
| 5,896,484 A | * 4/1999 | Borrelli et al. .............. | 385/132 |

FOREIGN PATENT DOCUMENTS

WO     WO 97/30364     8/1997

OTHER PUBLICATIONS

Vengsarkar et al., "Long–Period Fiber Gratings as Band–Rejection Filters", Journal of Lightwave Technology, vol. 14, No. 1, Jan. 1996, pp. 58–64.*

Othonos and Kalli, Fiber Bragg Gratings, Fundamentals and Applications in Telecommunications and Sensing. N.Y., Artech House, 1999. p. 80.*

"Long–Period Fiber Gratings as Band–Rejection Filters", by Vengsarkar et al., Journal of Lightwave Technology, vol. 14, No. 1, Jan. 1996, pp. 58–65.

"Temperature–insensitive Long–Period Fiber Gratings", by Judkins et al., PD1–1 –PD1–5.

"Handbook of Glass Data", by Mazurin et al., Elsevier, 1985, pp. 63, 28 and 366.

"A Novel Temperature–insensitive Long–period Fiber Grating Using a Boron–codoped–germanosilicate–core Fiber", by Shima et al., OFC '97 Technical Digest, pp. 347–348.

"Thermo–Induced Long–Period Fibre Gratings", E.M. Dianov et al., IOOC–ECOC. European Conference on Optical Communication ECOC. International Conference on Integrated Optics and Optical Fibre Communication IOOC, vol. 2, Sep. 22, 1997, pp. 53–56.

"Point–by–Point Fabrication of Micro–Bragg Gratings in Photosensitive Fibre Using Single Excimer Pulse Refractive Index Modification Techniques", B. Malo et al., Electronics Letters, vol. 29, No. 18, Sep. 2, 1993, pp. 1668–1669.

* cited by examiner

*Primary Examiner*—Mark A. Robinson
*Assistant Examiner*—Alessandro V. Amari
(74) *Attorney, Agent, or Firm*—McDermott, Will & Emery

(57) ABSTRACT

In an optical waveguide grating in an optical fiber having a cladding region around a core region, a periodic refractive index distribution is existed in a predetermined area of the core region along the optical axis. The core region has a composition of $GeO_2$—$P_2O_5$—$SiO_2$ based glass, for example, whereas the cladding region is made of $SiO_2$, and the co-doping ratio in the core region is adjusted, so as to lower the temperature dependence of characteristics. The doping amount of $P_2O_5$ in the core region is preferably $\frac{1}{15}$ to 1 times, more preferably 0.6 to 1 times that of $GeO_2$.

2 Claims, 8 Drawing Sheets

OPTICAL WAVEGUIDE GRATING AND METHOD OF MAKING THE SAME

RELATED APPLICATIONS

This is a Continuation-In-Part application of International Patent Application serial No. PCT/JP99/00040 filed on Jan. 8, 1999, now pending.

BACKGROUND OF THE INVENTION

1. Field of the Invention

The present invention relates to an optical waveguide grating formed in an optical waveguide such as an optical fiber, and a method of making the same.

2. Related Background Art

Various applications of optical waveguide gratings having a periodic refractive index changing area (grating area) along the optical axis of an optical waveguide to optical filters and the like in optical communication systems have conventionally been studied. Among others, those having a relatively long grating period of several hundreds of micrometers are known as long-period grating (see, for example, A. M. Vengsarkar, et al., J. Lightwave Tech., Vol. 14, No. 1, pp. 58–65, 1996), and their use in gain equalizers, band-stop filters, and the like is expected. Since characteristics of such a long-period optical waveguide grating have been known to vary with changes in temperature, temperature characteristics of optical waveguide gratings have been analyzed (see, for example, J. B. Judkins, et al., OFC '96, PD-1, 1996).

That is, in an optical waveguide grating, $SiO_2$ is used as a main ingredient of the optical waveguide, and $GeO_2$ is generally added thereto in order to form a core region, which is a light-propagating area of the optical waveguide, and periodically generate a refractive index modulation within the core region, so as to form a grating area. Since the change in refractive index with respect to temperature, i.e., the temperature dependence of refractive index, is greater in $GeO_2$ than in $SiO_2$, the temperature dependence of refractive index in the core region and that in its surrounding cladding region differ from each other. As a result, in a long-period optical waveguide grating formed in such an optical waveguide, the temperature dependence of effective refractive index for core-propagating light and that for cladding-mode light differ from each other, whereby peak wavelengths would vary when temperature changes.

The temperature dependence of each of the respective refractive indices of $SiO_2$ glass, $GeO_2$ glass, and $B_2O_3$ glass has been known (O. V. Mazurin, et al., "Handbook of Glass Data," Elsevier, 1985), and there has been known a technique based thereon in which, when an optical waveguide is a silica type optical fiber, its core region is co-doped with Ge element and B element, so as to lower the temperature dependence of characteristics of the optical waveguide grating (K. Shima, et al., OFC'97, FB2, 1997).

SUMMARY OF THE INVENTION

However, since the technique disclosed in the above-mentioned publication of Shima, et al., is based on the result of investigation of temperature dependence of refractive indices in three kinds of oxides ($SiO_2$, $GeO_2$, and $B_2O_3$) disclosed in the above-mentioned publication of O. V. Mazurin, et al., the optimal doping ratio can be adjusted only by combinations of these oxides, whereby the freedom in designing is limited. Also, since the infrared absorption edge of $B_2O_3$ is located on the shorter wavelength side from the respective infrared absorption edges of $SiO_2$ and $GeO_2$, the light absorption in the wavelength band of 1.55 $\mu$m will increase by one digit or more if an optimal amount of $B_2O_3$ is added to the optical waveguide. For example, an optical fiber having a relative refractive index difference of about 1% in which the doping ratio of Ge element and B element have been optimized yields an absorption loss of 24 dB/km, whereby it would not be applicable to practical use. Hence, there has been no development of optical waveguide gratings having a low temperature dependence and low absorption loss in the wavelength band of 1.55 $\mu$m, which is used for optical communications.

In order to overcome the problems mentioned above, it is an object of the present invention to provide an optical waveguide grating having a low temperature dependence and yielding a low absorption loss in the wavelength band of 1.55 $\mu$m, and a method of making the same.

Here, the temperature dependence of the peak wavelength $\lambda_m$ of mode coupling in an optical waveguide grating having a grating period of $\Lambda$ is represented by the following expression:

$$\frac{d\lambda_m}{dT} = \Lambda\left(\frac{dn_{01}}{dT} - \frac{dn_m}{dT}\right) \quad (1)$$

Here, $n_{01}$ is the effective refractive index of core-propagating light, $n_m$ is the effective refractive index of the m-th order cladding mode light, and T is the absolute temperature. Namely, $$\frac{dn_{01}}{dT}$$

is the temperature dependence of the core-propagating light, whereas $$\frac{dn_m}{dT}$$

is the temperature dependence of the m-th order cladding mode light. As can be seen from the above-mentioned expression, if the temperature dependence of effective refractive index for core-propagating light and that for cladding mode light can be caused to match each other, the temperature dependence of the peak wavelength $\lambda_m$ in the optical waveguide grating can be lowered.

From such a viewpoint, the inventors have studied the temperature dependence of refractive indices of various glass-forming oxides. The glass-forming oxides studied here are constituted by four kinds, i.e., pure $SiO_2$, $SiO_2$ doped with 10% of $GeO_2$, $SiO_2$ doped with 10% of $B_2O_3$, and $SiO_2$ doped with 10% of $P_2O_5$. For each of the glass-forming oxides, the refractive index difference $\Delta n$ with reference to pure $SiO_2$, and the temperature dependence of refractive index dn/dT were studied. The results are listed in the following Table 1.

TABLE 1

Refractive Indices of Glass-Forming Oxides and Their Temperature Dependence

| | Δn | dn/dT | Difference of dn/dT from $SiO_2$ |
|---|---|---|---|
| Pure $SiO_2$ | 0 | $1.380 \times 10^{-5}$ | 0 |
| 90% $SiO_2$-10% $GeO_2$ | +0.952% | $1.434 \times 10^{-5}$ | $+0.054 \times 10^{-5}$ |
| 90% $SiO_2$-10% $B_2O_3$ | −0.289% | $1.051 \times 10^{-5}$ | $-0.329 \times 10^{-5}$ |
| 90% $SiO_2$-10% $P_2O_5$ | +0.780% | $1.077 \times 10^{-5}$ | $-0.303 \times 10^{-5}$ |

As can be seen from Table 1, as with $B_2O_3$, the difference in temperature dependence dn/dT of $P_2O_5$ from pure $SiO_2$ is negative. Further, since $P_2O_5$ has an infrared absorption edge located on the longer wavelength side from that of $B_2O_3$, the absorption loss in the wavelength band of 1.55 μm would not deteriorate when it is added to silica glass. Consequently, the inventors have found it possible to lower the absorption loss in the wavelength band of 1.55 μm while yielding a temperature dependence dn/dT substantially matching that of pure $SiO_2$ if $P_2O_5$, in place of $B_2O_3$, is added to $SiO_2$ together with $GeO_2$.

The optical waveguide grating in accordance with the present invention is based on this finding, and is formed in an optical waveguide, mainly composed of $SiO_2$, having a cladding region around a core region, having an area where a refractive index of the core region changes periodically along the optical axis direction; wherein the core region is co-doped with $GeO_2$ and $P_2O_5$.

As a consequence of such a configuration, the temperature dependence dn/dT of the optical waveguide grating can substantially match that of pure $SiO_2$ without adding $B_2O_3$, which may enhance the absorption loss, or while reducing the amount of addition thereof. Hence, while the absorption loss in the wavelength band of 1.55 μm is suppressed, the temperature dependence of characteristics of the optical waveguide grating is lowered.

The molar doping amount of $P_2O_5$ in the core region is preferably 1/15 to 1 times, more preferably 0.6 to 1 times that of $GeO_2$. According to the inventors' findings, the temperature dependence and absorption loss can favorably be lowered if the molar doping ratio is set as such. Also, since the doping amount can be selected from such a range, it increases the design flexibility, and it is easy to manufacture.

Alternatively, the core region may further be doped with $B_2O_3$, such that the sum of respective molar doping amounts of $P_2O_5$ and $B_2O_3$ is 1/15 to 1 times the molar doping amount of $GeO_2$, whereas the molar doping amount of $B_2O_3$ is smaller than that of $P_2O_5$. According to the inventors' findings, if the molar doping amounts are set as such, then the increase in absorption loss in the wavelength band of 1.55 μm, which is seen when $B_2O_3$ and $GeO_2$ are doped without $P_2O_5$, can be suppressed, whereby the temperature dependence can favorably be lowered. Also, since the doping amount can be selected from such a range, it increases the design flexibility, and it is easy to manufacture.

Also, the cladding region may be doped with fluorine, and its refractive index may be adjusted so as to become lower than that of pure silica glass. As a consequence, the viscosity difference in core/cladding is lowered, so that the uniformity in processing improves at the time of processing a preform and drawing, whereby the ellipticity of the core is lowered, and an optical waveguide grating with a low polarization-dependent loss is obtained.

In this case, letting $\Delta n^-$ be the ratio of decrease in refractive index of the cladding region with respect to pure silica glass, the molar doping amount of $P_2O_5$ in the core region is preferably adjusted within the range of $(0.8-0.7\Delta n^-)\pm 0.2$ time that of $GeO_2$. According to the inventors' findings, when an F-doped cladding is employed, it is preferable for the doping amount to be set as such, in order to lower the temperature dependence of characteristics and the absorption loss, while matching the temperature dependence of the core and that on the cladding side. Also, since the doping amount can be selected from such a range, it increases the design flexibility and it is easy to manufacture.

On the other hand, the method of making an optical waveguide grating in accordance with the present invention is a method of making an optical waveguide grating of $SiO_2$—$GeO_2$—$P_2O_5$ based glass, in which, without loading the optical waveguide with hydrogen, or after loading the optical waveguide with hydrogen at a pressure of 20 atmospheres or less, said optical waveguide is irradiated with an ultraviolet ray having a wavelength ranging from 150 to 200 nm so as to form the grating.

In the conventional optical waveguide grating of $SiO_2$—$GeO_2$ based glass (further including $B_2O_3$), it has been necessary to load the optical waveguide with a large amount of hydrogen before making the grating; and, if hydrogen occluded in the grating is left as it is after the making, then thus occluded hydrogen may gradually be released to the outside of the optical waveguide, whereby characteristics of the grating may change. Therefore, it necessitates a hydrogen removing process, by which the grating wavelength may change. While the optical waveguide grating in accordance with the present invention comprises an $SiO_2$—$GeO_2$—$P_2O_5$ based glass as mentioned above, the inventors have found that a glass co-doped with $GeO_2$ and $P_2O_5$ is also photosensitive to ultraviolet rays having a wavelength of at least 150 nm but not greater than 200 nm, and that the hydrogen loading process is totally or substantially unnecessary when the ultraviolet rays having a wavelength ranging from 150 to 200 nm are employed. Therefore, according to the manufacturing method of the present invention, the optical waveguide grating can favorably be made without being influenced by occluded hydrogen.

Alternatively, the method may be such that the optical waveguide is spot-heated periodically along the optical axis direction so as to form the grating. In the glass co-doped with $GeO_2$ and $P_2O_5$, a stress is applied to the core/cladding interface due to the differences in viscosity and coefficient of thermal expansion in core/cladding. The inventors have found that a grating having desirable characteristics can favorably be made if this stress is periodically alleviated by thermal effects or if thermal diffusion of an additive is utilized. In this case, since the hydrogen loading process is totally unnecessary, there is no effect of such occluded hydrogen.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
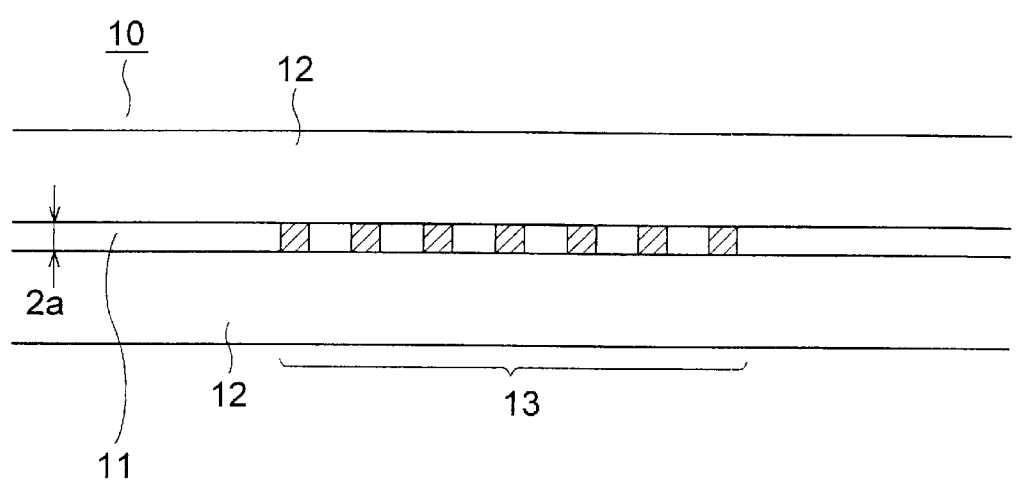
FIG. 1 is an explanatory view of the basic structure of the optical waveguide grating in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

FIG. 1 is a view for explaining the basic structure of the optical waveguide grating in accordance with the present invention. This drawing is a vertical sectional view obtained when an optical fiber 10, which is an optical waveguide, is cut along a plane including its optical axis. This embodiment is configured such that, in the optical fiber 10 having a cladding region 12 disposed around a core region 11, a periodic refractive index change is generated in a predetermined area 13 of the core region 11 along the optical axis. The core region 11 is made of $GeO_2$—$P_2O_5$—$SiO_2$ type glass, whereas the cladding region 12 is made of $SiO_2$. The co-doping ratio of $GeO_2$ and $P_2O_5$ in the core region 11 is adjusted, whereby the temperature dependence of characteristics is lowered.

Here, if the doping amount of $P_2O_5$ is smaller relative to that of $GeO_2$, then the temperature dependence of the refractive index of the core region 11 becomes greater than that of the refractive index of the cladding region 12, whereby the peak wavelength of the optical waveguide grating shifts to the longer wavelength side as temperature rises. If the doping amount of $P_2O_5$ is in excess, by contrast, then the temperature dependence of the refractive index of the core region 11 becomes lower than that of the refractive index of the cladding region 12, whereby the peak wavelength of the optical waveguide grating shifts to the shorter wavelength side as temperature rises.

Also, even when the composition is the same, the diameter $2a$ of the core region 11 may be made smaller so as to reduce the amount of confinement of core-propagating light into the core region 11 or, conversely, the diameter $2a$ of the core region 11 may be made greater so as to enhance the amount of confinement of core-propagating light into the core region 11. In the case where the temperature dependence of the refractive index of the core region 11 and that of the cladding region 12 differ from each other, even when they have the same composition, as the diameter $2a$ of the core region 11 is smaller, the temperature dependence of the effective refractive index of core-propagating light is closer to the temperature dependence of the refractive index of the cladding region 12, whereby the operating wavelength changes less with temperature. Namely, in the same composition, it is preferred that the diameter $2a$ of the core region 11 be smaller and the amount of confinement of core-propagating light into the core region 11 be smaller from the viewpoint that the temperature dependence is lower.

As mentioned above, the temperature dependence of the peak wavelength in a long-period optical waveguide grating varies depending on its optical waveguide configuration even when the composition is the same. In the optical waveguide grating of this embodiment, as a range in which the temperature dependence becomes lower than that of a $P_2O_5$-undoped optical waveguide grating, the doping amount of $P_2O_5$ in the core region 11 is preferably 1/15 to 1 times that of $GeO_2$.

In order to verify the effects of lowering the temperature dependence of characteristics of optical waveguide gratings by co-doping their core region with $P_2O_5$ and $GeO_2$, the inventors carried out comparative experiments in which several kinds of the optical waveguide grating in accordance with the first embodiment were prepared with their doping ratio of $P_2O_5$ and $GeO_2$ being mainly changed, and their characteristics were compared with each other. Their results will be reported in the following.

EXAMPLE 1

In an optical fiber having an outside diameter of 125 $\mu$m with a core region having a diameter of 3.3 $\mu$m, a grating was formed in the core region. In the core region, the $GeO_2$ doping amount and the $P_2O_5$ doping amount were 9.0 mol % and 1.5 mol %, respectively. Namely, the ratio of doping amount of $P_2O_5$ to $GeO_2$ was 1/6. Evaluation of various characteristics of this optical fiber revealed that the cutoff wavelength $\lambda_c$ was 880 nm, the relative refractive index difference $\Delta n$ of the core region with respect to the cladding region was 0.98%, and the absorption loss in the wavelength band of 1.55 $\mu$m was 1.1 dB/km.

After having been subjected to a hydrogen loading process under a pressure of 5 atmospheres at 50° C. for one week, the optical fiber was irradiated with $Ar^+$ laser light (having a wavelength of 242 nm), so as to form a long-period optical waveguide grating having a period of 402.5 $\mu$m in its core region.

When characteristics of optical waveguide grating thus obtained were studied, at a temperature of 25° C., the peak wavelength was 1537.2 nm, and the transmission loss at the peak wavelength was 4.8 dB. Also, the temperature dependence of peak wavelength was +0.012 nm/° C.

EXAMPLE 2

In an optical fiber having an outside diameter of 125 $\mu$m with a core region having a diameter of 3.1 $\mu$m, a grating was formed in the core region. In the core region, the $GeO_2$ doping amount and the $P_2O_5$ doping amount were 8.3 mol % and 3.2 mol %, respectively. In other word, the ratio of doping amount of $P_2O_5$ to $GeO_2$ was 0.386. Evaluation of various characteristics of this optical fiber revealed that the cutoff wavelength $\lambda_c$ was 845 nm, the relative refractive index difference Δn of the core region with respect to the cladding region was 1.04%, and the absorption loss in the wavelength band of 1.55 μm was 1.2 dB/km.

After a hydrogen loading under a pressure of 5 atmospheres at 50° C. for one week is processed, the optical fiber was irradiated with Ar⁺ laser light (having a wavelength of 242 nm), so as to form a long-period optical waveguide grating having a period of 405 μm in its core region.

When characteristics of optical waveguide grating thus obtained were studied, at a temperature of 25° C., the peak wavelength was 1536.8 nm, and the transmission loss at the weak wavelength was 4.0 dB. Also, the temperature dependence of peak wavelength was −0.032 nm/° C.

EXAMPLES 3 TO 9

In each of seven optical fibers having an outside diameter of 125 μm with a core region having a diameter of about 3 μm, a grating was formed in the core region. Table 2 lists the ratio of molar doping amount of $P_2O_5$ to $GeO_2$, cutoff wavelength $\lambda_c$, polarization mode dispersion value (PMD), and city of the core in each fiber.

TABLE 2

Characteristics of Optical Fibers for Fabricating Gratings in Examples

| Example | Δn | Ellipticity | $\lambda_c$ | $P_2O_5/GeO_2$ | PMD@10 m |
|---------|-------|-------------|--------|----------------|----------|
| 3 | 1.69% | 1.23% | 850 nm | 0.36 | 0.230 ps |
| 4 | 1.90% | 2.69% | 870 nm | 0.47 | 1.070 ps |
| 5 | 1.06% | 0.88% | 820 nm | 0.66 | 0.070 ps |
| 6 | 1.21% | 1.35% | 860 nm | 0.50 | 0.201 ps |
| 7 | 1.11% | 1.19% | 890 nm | 1.40 | 0.011 ps |
| 8 | 1.19% | 1.41% | 840 nm | 1.73 | 0.060 ps |
| 9 | 1.32% | 0.41% | 850 nm | 1.00 | 0.036 ps |

After a hydrogen loading under a pressure of 5 atmospheres at 50° C. for one week is processed, these optical fibers were irradiated with Ar⁺ laser light (having a wavelength of 242 nm), so as to form a long-period optical waveguide grating having a period of 405 μm in their core region.

Figure 2:
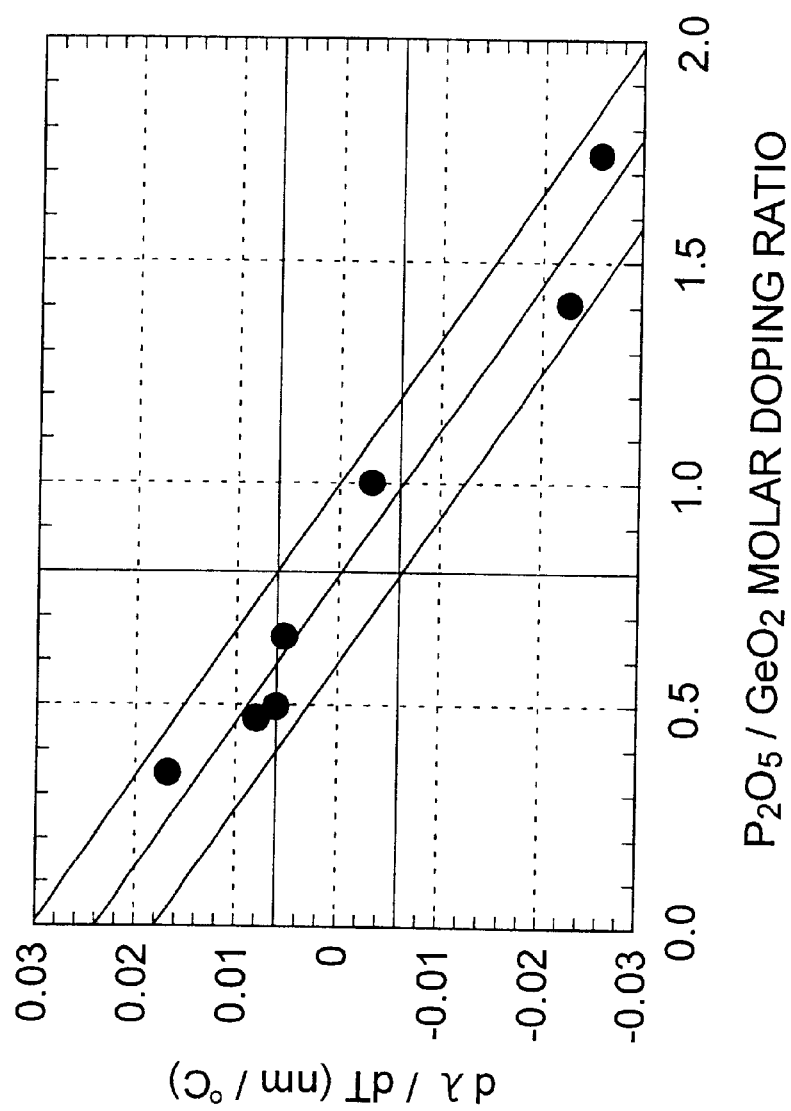
FIG. 2 is a graph showing a correlation between the ratio of $P_2O_5$/$GeO_2$ molar doping amount in optical waveguide gratings in accordance with a first embodiment and the temperature shift $d\lambda/dT$ of their loss peaks.

Table 3 and FIG. 2 collectively indicate the results of studies concerning characteristics of individual optical waveguide gratings thus obtained. FIG. 2 is a graph in which changes in loss peak of optical waveguide gratings thus obtained in the wavelength band of 1.55 μm (1.50 μm to 1.60 μm) with temperature were studied within the temperature range of 0 to 45° C., and the results were plotted using the abscissa as the molar doping amount ratio of $P_2O_5/GeO_2$ and the ordinate as thus determined temperature shift dλ/dT of peak.

TABLE 3

Characteristics of Optical Waveguide Gratings Obtained

| Example | Peak wavelength | dλ/dT at less wavelength | Polarization-dependent loss |
|---------|-----------------|--------------------------|------------------------------|
| 3 | 1552 nm | +0.0172 nm/° C. | 0.224 dB |
| 4 | 1528 nm | +0.0077 nm/° C. | 0.525 dB |
| 5 | 1504 nm | +0.0053 nm/° C. | 0.132 dB |
| 6 | 1541 nm | +0.0067 nm/° C. | 0.152 dB |
| 7 | 1553 nm | −0.0223 nm/° C. | 0.082 dB |

TABLE 3-continued

Characteristics of Optical Waveguide Gratings Obtained

| Example | Peak wavelength | dλ/dT at less wavelength | Polarization-dependent loss |
|---------|-----------------|--------------------------|------------------------------|
| 8 | 1561 nm | −0.0262 nm/° C. | 0.122 dB |
| 9 | 1550 nm | −0.0031 nm/° C. | 0.020 dB |

As can be seen from FIG. 2, a correlation was found to exist between the molar doping amount ratio of $P_2O_5/GeO_2$ and the temperature shift dλ/dT of loss peak. Here, it was found particularly preferable for the temperature shift to lie within the range of ±0.006 nm/° C., and that, for making an optical waveguide grating whose temperature was within this range, the range of molar doping amount ratio of $P_2O_5/GeO_2$ was 0.8±0.2, i.e., 0.6 to 1.0. Therefore, the molar doping amount ratio of $P_2O_5/GeO_2$ is most preferably set within this range.

A second embodiment of the optical waveguide grating in accordance with the present invention will now be explained. This embodiment is structurally similar to the first embodiment and has the structure shown in FIG. 1, except that the cladding region 12 is made of F-doped $SiO_2$.

Since the cladding region 12 is doped with F element, the dn/dT of the cladding is lowered. Therefore, as the F element doping concentration in the cladding region is higher, the $P_2O_5$ doping amount to the core region is required to be higher as compared with the first embodiment.

In order to verify the effects of lowering the temperature dependence of characteristics of optical waveguide gratings having a cladding made of F-doped $SiO_2$ and a core region co-doped with $P_2O_5$ and $GeO_2$, the inventors carried out comparative experiments in which several kinds of the optical waveguide gratings in accordance with the second embodiment were prepared with their doping ratio of F in the cladding region and doping ratio of $P_2O_5$ and $GeO_2$ in the core region being changed, and their characteristics were compared with each other. Their results will be reported in the following.

EXAMPLES 10 TO 13

Using an F-doped silica glass pipe as a starting pipe, several kinds of optical fiber preforms each having a core made of $GeO_2$—$P_2O_5$—$SiO_2$ co-doped glass and a cladding made of $SiO_2$—F glass were prepared by MCVD method, and these preforms were used for making four kinds of optical fibers. In each optical fiber, the outside diameter was 125 μm, and the diameter of its core region was about 3 μm. Table 4 lists the amount of decrease of refractive index Δn⁻ of the cladding region with respect to pure silica glass, ratio of molar doping amount of $P_2O_5$ to $GeO_2$, cutoff wavelength $\lambda_c$, polarization mode dispersion value (PMD), relative refractive index difference Δn of the core region with respect to the cladding region, and ellipticity of the core in each fiber.

TABLE 4

Characteristics of Optical Fibers
for Fabricating Gratings in Examples

| Example | $\Delta n^-$ | $\Delta n$ | Ellipticity | $\lambda_c$ | $P_2O_5/GeO_2$ | PMD@10 m |
|---|---|---|---|---|---|---|
| 10 | 0.35% | 1.40 | 0.69% | 850 nm | 1.270 | 0.0033 ps |
| 11 | 0.35% | 1.40 | 0.73% | 870 nm | 0.846 | 0.0011 ps |
| 12 | 0.35% | 1.54 | 0.72% | 820 nm | 0.688 | 0.0039 ps |
| 13 | 0.70% | 1.21 | 0.55% | 860 nm | 1.272 | 0.0011 ps |

When these optical fibers were made, the glass temperature at the time of collapsing the optical fiber preform was 1390° C. and 1220° C. in the case where $\Delta n^-$ was 0.35% and 0.70%, respectively, thus being much lower than the average of 1580° C. in the case where pure $SiO_2$ is used as the cladding region. While the ellipticity of the fiber of each example is a better value than those of the optical fibers having pure $SiO_2$ claddings shown in Table 2, it is because of the fact that the liquefaction the core region is suppressed due to the temperature drop upon the collapsing.

After a hydrogen loading process under a pressure of 5 atmospheres at 50° C. for one week is processed, these optical fibers were irradiated with Ar+ laser light (having a wavelength of 242 nm), so as to form a long-period optical waveguide grating having a period of 405 μm in their core region.

Figure 3:
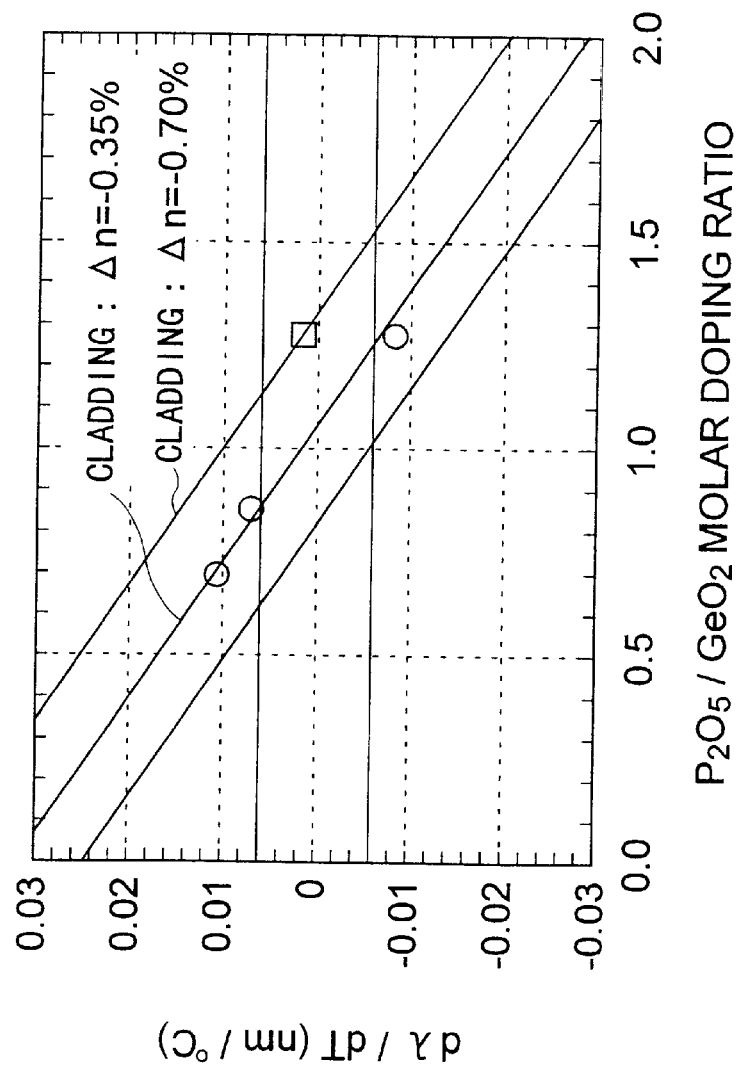
FIG. 3 is a graph showing a correlation between the ratio of $P_2O_5$/$GeO_2$ molar doping amount in optical waveguide gratings in accordance with a second embodiment and the temperature shift $d\lambda/dT$ of their loss peaks.

Table 5 and FIG. 3 collectively indicate the results of studies concerning characteristics of individual optical waveguide gratings thus obtained. FIG. 3 is a graph in which changes in loss peak of optical waveguide gratings thus obtained in the wavelength band of 1.55 μm (1.50 μm to 1.60 μm) with temperature were studied within the temperature range of 0 to 45° C., and the results were plotted using the abscissa as the molar doping amount ratio of $P_2O_5/GeO_2$ and the ordinate as thus determined temperature shift $d\lambda/dT$ of loss peak.

TABLE 5

Characteristics of Optical Waveguide
Gratings Obtained

| Example | Peak wavelength | $d\lambda/dT$ at loss peak wavelength | Polarization-dependent loss |
|---|---|---|---|
| 10 | 1537 nm | −0.0083 nm/° C. | 0.032 dB |
| 11 | 1542 nm | +0.0070 nm/° C. | 0.010 dB |
| 12 | 1555 nm | +0.0104 nm/° C. | 0.015 dB |
| 13 | 1549 nm | +0.0019 nm/° C. | 0.008 dB |

As shown in FIG. 3, a correlation was found to exist between the molar doping amount ratio of $P_2O_5/GeO_2$ and the temperature shift $d\lambda/dT$ of loss peak. Here, it was found particularly preferable for the temperature shift to lie within the range of ±0.006 nm/° C., and that, for making an optical waveguide grating whose temperature shift is within this range, the range of molar doping amount ratio of $P_2O_5/GeO_2$ may be set to 0.85 to 1.25 when $\Delta n^-$ is 0.35%, and 1.1 to 1.5 when $\Delta n^-$ is 0.70%. As a consequence, it was found that, if a preferable range of $P_2O_5/GeO_2$ molar ratio is expressed in terms of a function of $\Delta n^-$, the ratio thereof can be expressed by "$(0.8-0.7\Delta n^-)\pm 0.2$." Also, it was verified that using F-doped $SiO_2$ in the cladding region can reduce the ellipticity of the core, thus making it possible to realize a long-period optical waveguide grating having a low polarization-dependent loss (PDL).

A third embodiment of the optical waveguide grating in accordance with the present invention will now be explained. This embodiment also has the structure shown in FIG. 1 as with the first and second embodiments. It differs from the first embodiment in that the core region 11 is constituted by a $GeO_2$—$B_2O_3$—$P_2O_5$—$SiO_2$ based glass.

Arguments similar to those mentioned above in the optical waveguide grating in accordance with the first embodiment also hold true in the optical waveguide grating in accordance with this embodiment. In this embodiment, $B_2O_3$ doping and $P_2O_5$ doping are on a par with each other in terms of the effect of canceling the increase in refractive index temperature coefficient caused by $GeO_2$ doping. However, since the infrared absorption loss increases when the $B_2O_3$ doping amount is in excess, it is desirable that the $B_2O_3$ doping amount be lower than the $P_2O_5$ doping amount. Namely, it is preferred that, in the core region 11, the sum of the $P_2O_5$ doping amount and $B_2O_3$ doping amount be 1/15 to 1 times the $GeO_2$ doping amount while the $B_2O_3$ doping amount is smaller than the $P_2O_5$ doping amount.

Some embodiments of a method for favorably making an optical waveguide grating in accordance with the present invention, i.e., preferred embodiments of the method of making an optical waveguide grating in accordance with the present invention will now be explained.

Figure 4:
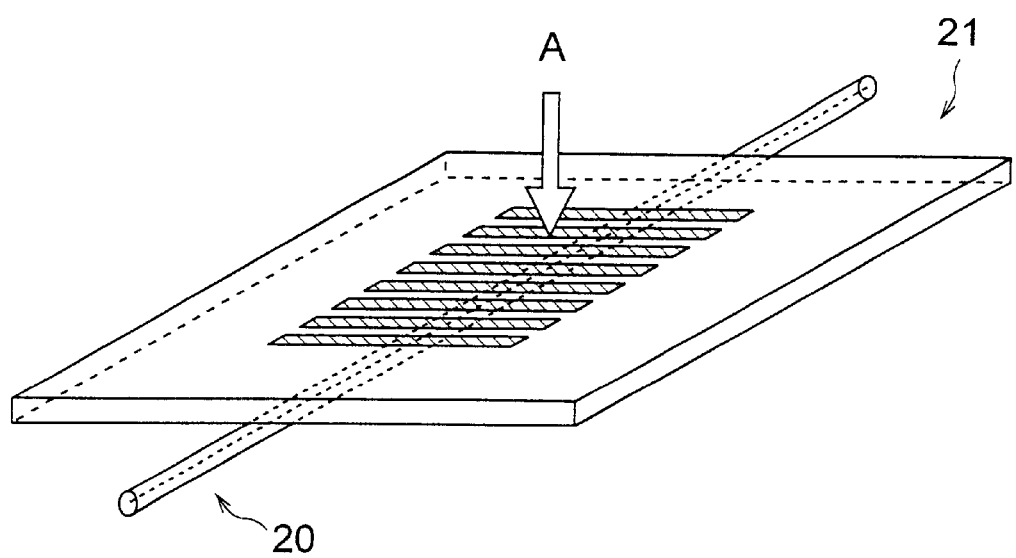
FIG. 4 is an explanatory view showing a first embodiment of the method of making an optical waveguide grating in accordance with the present invention.

FIG. 4 shows a first embodiment of the method of making an optical waveguide grating in accordance with the present invention. On an optical fiber 20 having a core region not loaded with hydrogen, a comb-shaped mask 21 prepared in conformity to the grating form of the optical waveguide grating to be made is disposed, and this optical waveguide is irradiated with ArF excimer laser (having a wavelength of 193 nm) in the direction of arrow A, whereby the refractive index of the area irradiated with ultraviolet rays in the core region of the optical fiber 20 is changed upon exposure to the ultraviolet rays, so as to form a grating with a predetermined pitch.

In the conventional method of making an optical waveguide grating, the core region is processed by hydrogen loading, so that the photosensitivity of the core region is enhanced by thus loaded hydrogen, whereby a refractive index changing area is formed. The inventors have found that the $GeO_2$—$P_2O_5$—$SiO_2$ type optical fiber, which becomes a material for the optical waveguide grating in accordance with the present invention, has a sufficient photosensitivity in an ultraviolet wavelength region of 150 to 200 nm even without hydrogen loading. The manufacturing method of this embodiment is based on this finding.

Figure 5:
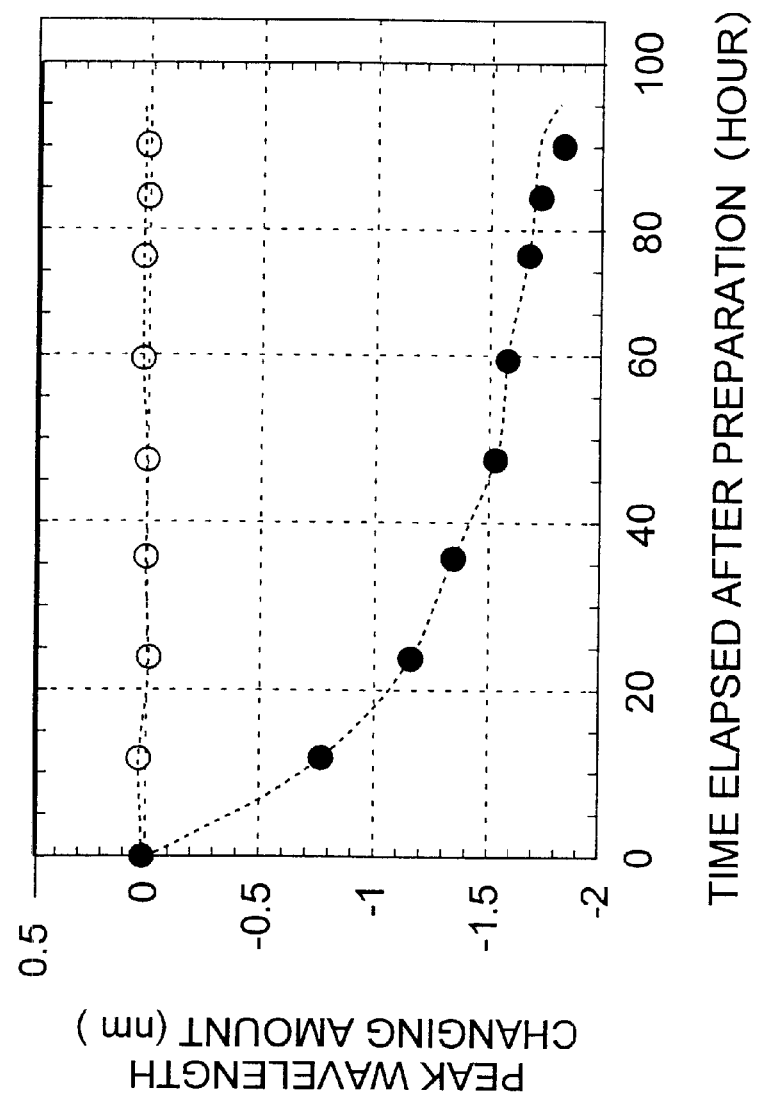
FIG. 5 is a graph comparing changes in the peak wavelength of the gratings over time in the optical waveguide grating made by the method of the first embodiment and an optical waveguide grating made by a conventional method after their preparation.

FIG. 5 shows the result of comparison concerning amounts of change in peak wavelength in the respective optical waveguide gratings made according to this method and the conventional method, in which a grating is made by irradiation with KrF laser (having a wavelength of 248 nm) after the hydrogenation process, after their preparation. Here, black circles indicate the optical waveguide grating made by the conventional method, whereas white circles indicate the optical waveguide grating made by the method of this embodiment. According to the conventional method, as can be seen from this graph, the peak wavelength shifts to the shorter wavelength side as the time passes. This is caused by the fact that occluded hydrogen decreases because of its effusion. In this embodiment, since no hydrogen is added, no occluded hydrogen exists, whereby the peak wavelength would not shift to the shorter wavelength side due to such hydrogen effusion. Though in the conventional method the peak wavelength is set assuming such shift toward the shorter wavelength, such assumption is unnecessary in this embodiment, whereby the peak wavelength can be set more accurately.

Figure 6:
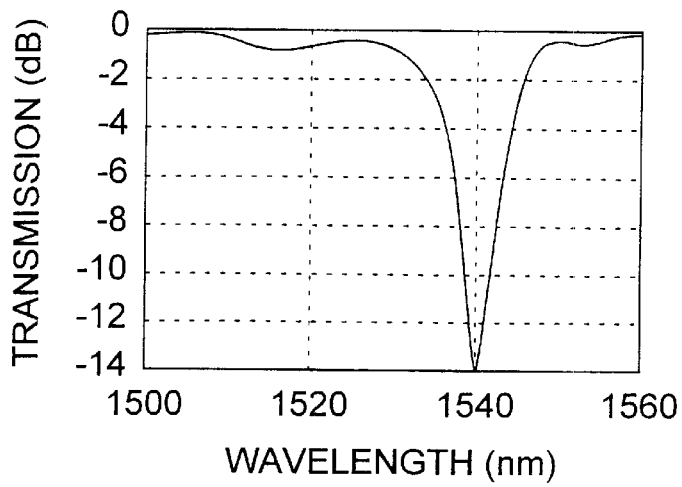
FIGS. 6 to 8 are charts showing transmission spectra of three kinds of long-period gratings made by the method of the first embodiment, respectively.
Figure 7:
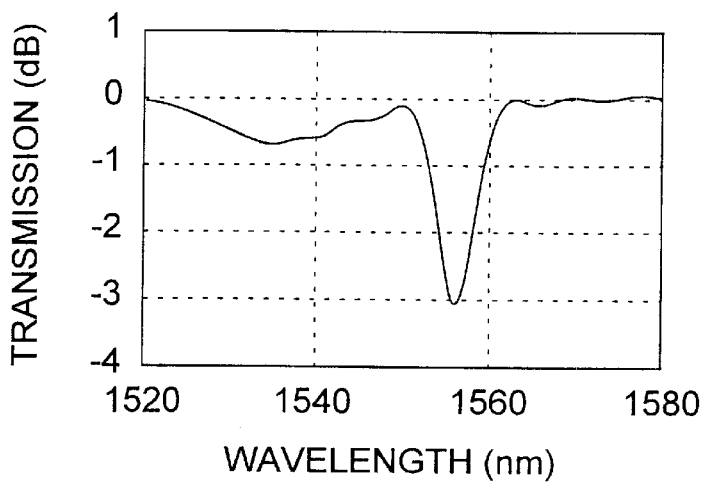
Figure 8:
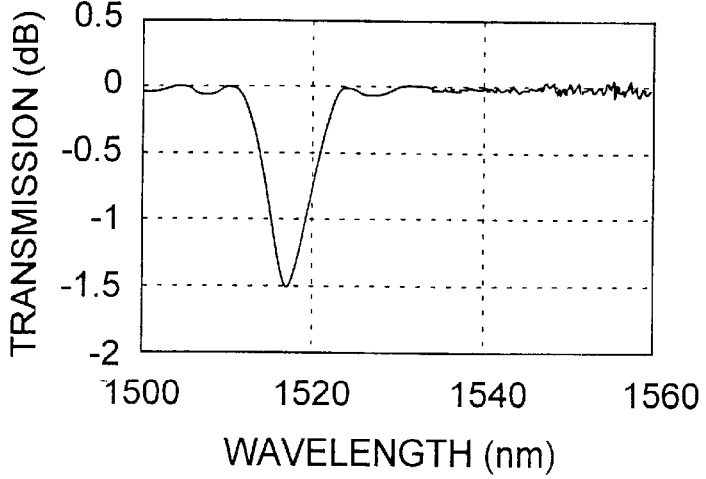

Using three kinds of optical fibers in Examples 5 to 7 shown in Table 2 as respective materials, long-period gratings were made while employing a comb-shaped mask having a period of 423 μm and a duty cycle of 0.5 in accordance with this embodiment. Their ultraviolet ray irradiation intensities were set to 37, 12, and 7 mJ/cm²/pulse, respectively, and the laser oscillation frequency was set to 20 Hz. FIGS. 6 to 8 show the respective transmission spectra of thus made long-period gratings. Favorable transmission characteristics were obtained in each of them. Their temperature dependence values of peak wavelength were 0.0062, 0.0102, and −0.0190 nm/° C., respectively, whereby it was verified that favorable characteristics on a par with those of the long-period gratings shown in Table 4 were obtained. Though the case with no hydrogen loading is explained here, a small amount of hydrogen may be loaded as well. In the case where a small amount of hydrogen is to be loaded, it is preferred that the hydrogen loading process be carried out under a low pressure of 20 atmospheres or less. Thus, the shift toward the shorter wavelength can be suppressed.

Figure 9:
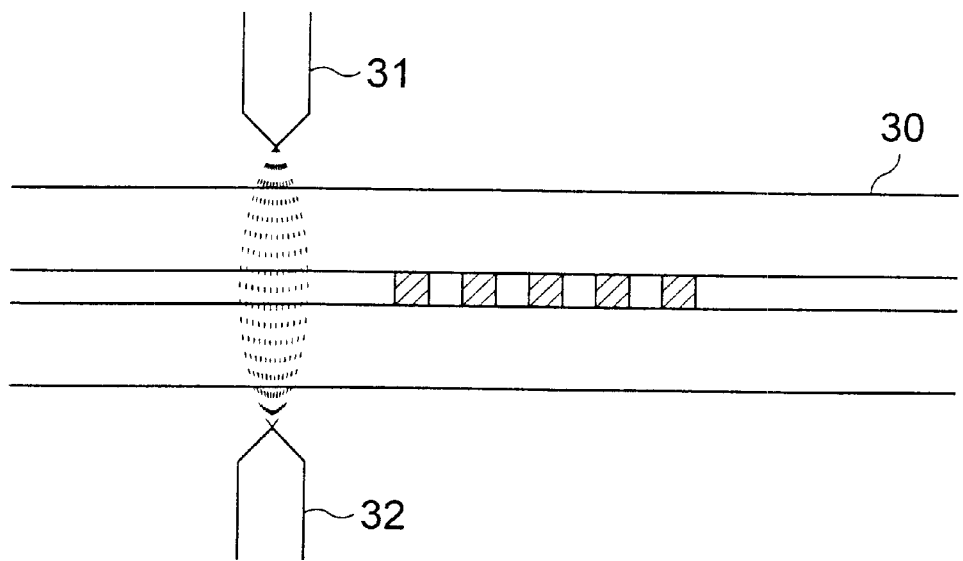
FIG. 9 is an explanatory view showing a second embodiment of the method of making an optical waveguide grating in accordance with the present invention.

A second embodiment of the method of making an optical waveguide grating in accordance with the present invention will now be explained with reference to FIG. 9. An optical fiber 30 is disposed between discharge electrodes 31, 32 of an arc discharge type fiber fusing splicer, and axial movements of the optical fiber 30 and spot-heating of minute parts of the optical fiber 30 between the discharge electrodes 31, 32 while the optical fiber 30 stands still are repeatedly effected, whereby the stress in the core/cladding interface caused by the differences in viscosity and coefficient of thermal expansion of core/cladding is periodically alleviated. Thus, a grating is formed. Thermal diffusions of Ge and P also contribute to the forming of this grating.

Figure 10:
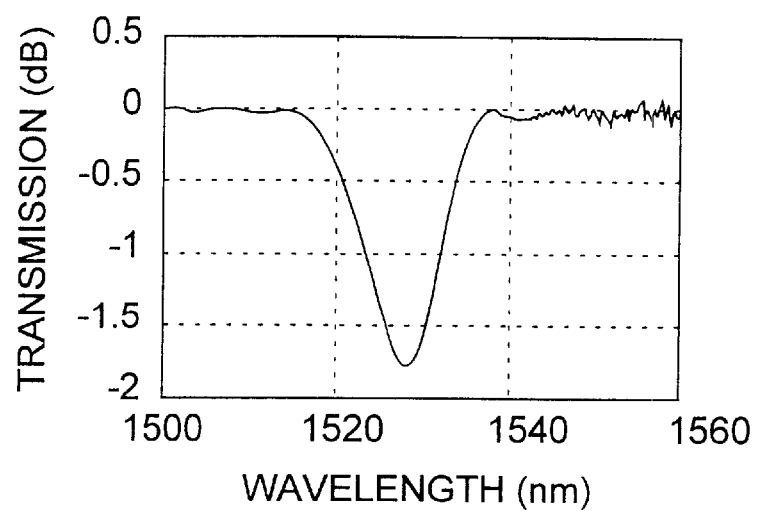
FIG. 10 is a chart showing the transmission spectrum of the long-period grating made by the method of the second embodiment.

Using the optical fiber of Example 5 in Table 2, a grating was made with a discharge interval of 400 μm and a discharge application length of 10 mm. FIG. 10 shows the result of measurement of the transmission spectrum in long-period grating thus obtained. As can be seen from this chart, favorable transmission characteristics were obtained. Also, the temperature dependence value of peak wavelength in this long-period grating was 0.0065 nm, whereby it was verified that favorable characteristics on a par with those of the long-period gratings made in the first embodiment were obtained. Since no hydrogen loading process is unnecessary, spontaneous release of occluded hydrogen would not occur in this embodiment as well, whereby its resultant shift of peak wavelength, toward the shorter wavelength would not occur.

Without being restricted to the above-mentioned embodiments, the present invention can be implemented in various manners. For example, though the above-mentioned embodiments relate to optical waveguide gratings formed in optical fibers as optical waveguides, they are similarly applicable to optical waveguide gratings formed in a planar optical waveguide on a substrate.

What is claimed is:

1. An optical waveguide grating which is formed in an optical waveguide mainly composed of $SiO_2$ and having a core region and a cladding region around said core region, said grating being formed by providing said core region with an area in which a refractive index thereof changes periodically in the direction of its optical axis so as to form a long-period grating, wherein said core region is co-doped with $GeO_2$ and $P_2O_5$, and the ratio of molar doping amount of $P_2O_5$ and $GeO_2$ is adjusted for controlling temperature dependence of the loss peak wavelength, wherein said cladding region is doped with fluorine and has a refractive index adjusted so as to be lower than that of pure silica glass; and wherein letting $\Delta n^-$ be the ratio of decrease in refractive index of said cladding region with respect to pure silica glass, the molar doping amount of $P_2O_5$ in said core region is adjusted within the range of $(0.8-0.7\ \Delta n^-)$ ±0.2 times that of $GeO_2$.

2. A method of making an optical waveguide grating according to claim 1, comprising:

spot heating said optical waveguide periodically along the optical axis direction so as to form the grating.

\* \* \* \* \*